United States Patent
Erhart et al.

(10) Patent No.: US 7,702,083 B2
(45) Date of Patent: Apr. 20, 2010

(54) METHOD AND APPARATUS FOR PROVIDING DEFAULT MEDIA CONTENT TO A CALLING PARTY

(75) Inventors: George W. Erhart, Pataskala, OH (US); Valentine C. Matula, Granville, OH (US); David Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 1393 days.

(21) Appl. No.: 11/068,096

(22) Filed: Feb. 28, 2005

(65) Prior Publication Data
US 2006/0193452 A1 Aug. 31, 2006

(51) Int. Cl.
*H04M 3/487* (2006.01)
(52) U.S. Cl. .................. 379/88.22; 379/373.01; 709/229; 713/157
(58) Field of Classification Search ............. 370/352, 370/252; 379/88.22, 142.08, 266.01, 88.13, 379/93.11, 373.01; 709/217, 227, 229; 382/100; 707/104.1; 713/151
See application file for complete search history.

(56) References Cited

U.S. PATENT DOCUMENTS

| | | | |
|---|---|---|---|
| 6,438,599 B1 * | 8/2002 | Chack ..................... 709/229 |
| 6,574,660 B1 * | 6/2003 | Pashupathy et al. ......... 709/217 |
| 6,587,548 B2 * | 7/2003 | Brandenberger ......... 379/93.11 |
| 6,934,837 B1 * | 8/2005 | Jaisimha et al. ............. 713/151 |
| 7,095,733 B1 * | 8/2006 | Yarlagadda et al. ......... 370/352 |
| 7,130,400 B2 * | 10/2006 | Simpson et al. ........ 379/142.08 |
| 7,171,018 B2 * | 1/2007 | Rhoads et al. .............. 382/100 |
| 7,233,658 B2 * | 6/2007 | Koser et al. ............ 379/373.01 |
| 2002/0191775 A1 * | 12/2002 | Boies et al. ............ 379/266.01 |
| 2004/0190689 A1 * | 9/2004 | Benitez Pelaez et al. . 379/88.13 |
| 2005/0060411 A1 * | 3/2005 | Coulombe et al. .......... 709/227 |
| 2005/0102324 A1 * | 5/2005 | Spring et al. ............. 707/104.1 |
| 2005/0201531 A1 * | 9/2005 | Kanter et al. ............ 379/88.13 |
| 2006/0013148 A1 * | 1/2006 | Burman et al. .............. 370/252 |
| 2006/0120560 A1 * | 6/2006 | Davis et al. ................. 382/100 |

* cited by examiner

*Primary Examiner*—Gerald Gauthier
(74) *Attorney, Agent, or Firm*—Joseph B. Ryan; Jason Paul DeMont; Wayne S. Breyer

(57) ABSTRACT

Methods and apparatus are provided for presenting default content to a caller when a media stream of the specified type is not available. If it is determined that a destination endpoint is not providing a media stream of a first media type to an originating endpoint, a transmission of default media of the first media type to the originating endpoint is initiated.

26 Claims, 4 Drawing Sheets

METHOD AND APPARATUS FOR PROVIDING DEFAULT MEDIA CONTENT TO A CALLING PARTY

FIELD OF THE INVENTION

The present invention relates generally to communication methods and systems, and more particularly, to methods and systems that provide default media content when a media stream of the specified type is not available.

BACKGROUND OF THE INVENTION

Many companies employ contact centers, such as call centers, to provide an interface for exchanging information with customers. In many call center environments, a customer service representative initially queries a caller for information, such as an account number, credit card number, or the nature of the inquiry. The customer service representative may be a real person or a virtual agent that typically routes the call to the appropriate destination after collecting initial information.

For example, many call centers employ interactive voice response (IVR) systems, such as the CONVERSANT® System for Interactive Voice Response, commercially available from Avaya Inc., that provide callers with information in the form of recorded messages and to obtain information from callers using keypad or voice responses to recorded queries. Ports on the IVR systems are often referred to as "automated agents" or "virtual agents." Typically, a media server receives a call, obtains the appropriate Voice extensible Markup Language (VoiceXML) page (i.e., a script for the call) from a dedicated local or remote server and then executes the VoiceXML page for the caller.

Increasingly, call centers are leveraging the power of the Internet to support multimedia communications. Multimedia communications allow a call center to efficiently exchange information with a user using a number of different media. For example, a call center can employ a video portion of a multimedia communication to present a caller with a graphical menu of the IVR options, and use the audio portion of the multimedia communication to receive a spoken or keypad menu selection from the user. U.S. patent application Ser. No. 10/983,558, filed Nov. 8, 2004, and entitled "Dynamic Content Delivery," incorporated by reference herein, discloses a system for the delivery of relevant content to a caller engaged in a call, for example, with a call center.

The disclosed dynamic content delivery system allows a call center to provide a richer experience to the caller by sending multimedia content, such as images, video, audio or text, to a caller that is based on the state of the conversation. For example, a call center can present a caller with additional information about a product that the caller has inquired about (or one or more complementary products), including video advertisements or web pages with links for further information. As another example, when a caller contacts a doctor's office to make an appointment for a physical, the caller may receive a video reminder to fast for 12 hours before the appointment.

While the disclosed dynamic content delivery system greatly improves the perceived experience of a caller, and allows a call center to more effectively present information to a caller, it suffers from one or more limitations, which if overcome, could further improve the utility and performance of such dynamic content delivery systems. In particular, in a call center environment, a call is typically transferred and connected to one or more destination nodes. Each destination node, however, may not support all of the media types supported by the caller. For example, if a call is established between a caller and a call center, and a caller is initially presented by the IVR system with a graphical menu of the IVR options, the caller may make a menu selection that results in the call being transferred to a destination node that does not support a video connection. Thus, upon transfer, the caller will no longer receive a video connection and will unfortunately experience a "dark screen." This is not desirable from the caller's point of view, and constitutes a lost opportunity for the call center to effectively present information to the caller.

A need therefore exists for methods and apparatus for presenting default content to a caller when a media stream of the specified type is not available and during transitional periods, such as times of call setup, transfer or hold. A further need exists for a method and apparatus for providing default media services to endpoints.

SUMMARY OF THE INVENTION

Generally, methods and apparatus are provided for presenting default content to a caller when a media stream of the specified type is not available. If it is determined that a destination endpoint is not providing a media stream of a first media type to an originating endpoint, a transmission of default media of the first media type to the originating endpoint is initiated.

The present invention can be implemented by a server-side device associated with the destination endpoint, by client-side device associated with the originating endpoint, or by a device associated with a carrier, such as an Internet Service Provider. The determination that a destination endpoint is not providing a media stream of the first media type can be made by accessing a table that identifies the media capabilities of the destination endpoint, observing the signaling between the originating endpoint and destination endpoint, or by observing the media stream itself between the originating endpoint and destination endpoint.

For example, if an originating device supports a video connection, a default video stream can be provided to the originating device until the call is connected to a destination endpoint that delivers video content to the originating endpoint. In this manner, an originating endpoint will not be presented with a "dark screen" as his or her call is transferred, queued, or connected to endpoints (such as operator consoles) that do not have video capabilities.

A more complete understanding of the present invention, as well as further features and advantages of the present invention, will be obtained by reference to the following detailed description and drawings.

DETAILED DESCRIPTION

Figure 1:
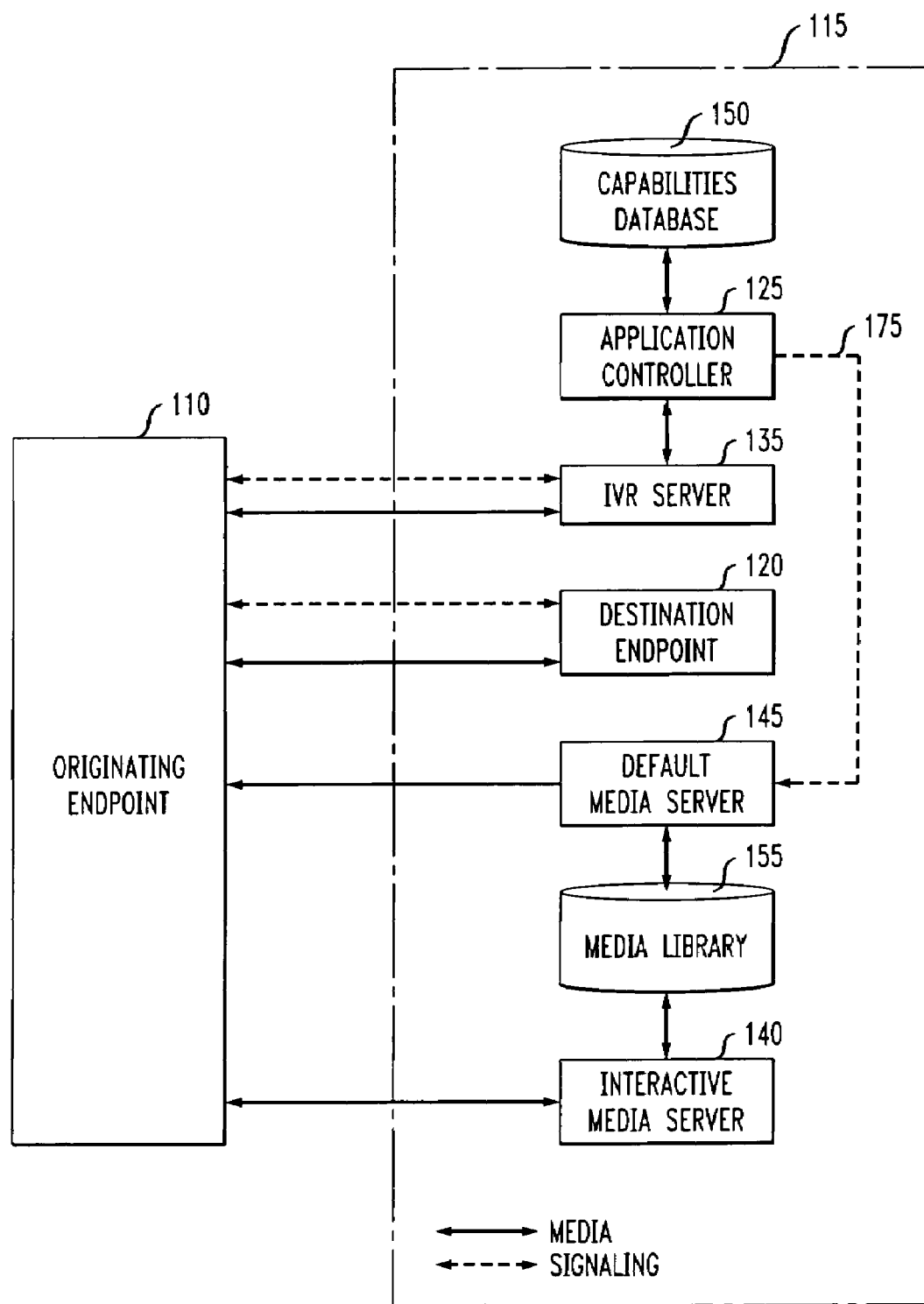
FIG. 1 illustrates an exemplary network environment in which a first embodiment the present invention can operate.

The present invention provides methods and apparatus for presenting default content to a caller when a media stream of the specified type is not available. The disclosed default media system provides default media services to endpoints. For example, when a call comes in from an originating device that supports a video connection, a default video stream would be provided to the originating device until the call is connected to an endpoint that delivers video content. In this manner, a caller will not be presented with a "dark screen" as his or her call is transferred, queued, or connected to endpoints (such as operator consoles) that do not have video capabilities.

While the present invention is illustrated using an exemplary SIP environment, the invention could be implemented using any communication protocol where endpoints contact each other and deliver media streams to each other, as would be apparent to a person of ordinary skill in the art.

According to one aspect of the invention, methods and apparatus for provided for delivering a media stream of a given type to an originating endpoint device that supports the given media type when a destination endpoint is not available or capable of delivering the media stream of the given type. During transitional periods, such as initial call setup, tear down, transfer or hold, the destination endpoint may not be identified or available. In this case, there is no media stream to be delivered by the unidentified destination endpoint device. In this case, the server handling the routing may deliver or designate another server to deliver a default media stream until a connection with the destination endpoint is completed. In addition, even after a call is connected to a destination endpoint, the destination endpoint may not be capable of delivering a media stream of a given media type that is supported by the originating endpoint. In this case, the server that negotiated the connection may deliver a media stream of its own in place of the empty or non supported media stream.

The present invention can determine that a destination endpoint is not providing a media stream of a given media type (i) by accessing a capabilities database to determine the media capabilities of the destination endpoint, as part of a call transfer; (ii) as part of the signaling with the destination endpoint before transferring a call to the destination endpoint; or (iii) by monitoring the communication between the originating endpoint and the destination endpoint.

Upon such a determination that a destination endpoint is not providing a media stream of a given media type, a default media source can be directed to provide an appropriate media stream of the given media type. As discussed hereinafter, the default media source can be associated with the originating endpoint, a carrier, such as an Internet Service Provider (ISP) or with the destination endpoint, such as a default media server in the same domain as the destination endpoint. While the present invention is illustrated using a server-side determination that a destination endpoint is not providing a media stream of a given media type, the present invention can also be implemented using a client-side implementation (or similar functionality in the communication carrier), as would be apparent to a person of ordinary skill in the art, based on the disclosure herein.

Determination by Capabilities Database

FIG. 1 illustrates an exemplary network environment in which a first embodiment the present invention can operate. Generally, an application controller 125 determines that a destination endpoint 120 cannot provide a media stream of a given media type by accessing a capabilities database 150 to determine the media capabilities of the destination endpoint 120, as part of the call transfer. As shown in FIG. 1, an originating endpoint 110 contacts a call center 115, by means of a network (not shown). The network may be a public or private wide or local area network (LAN), or any combination thereof. It is noted that the solid lines in FIG. 1 indicate a media channel, while the dashed lines in FIG. 1 indicate a signaling path.

The originating endpoint 110 may be embodied as any communication device that allows a caller to establish a multimedia communication with a call center 115, such as a conventional, cellular or IP telephone or a computing device. The application controller 125 may be embodied, for example, as an application created by the "Speech Application Builder," commercially available from Avaya Inc. of Basking Ridge, N.J., as modified herein to carry out the features and functions of the present invention.

Typically, when the originating endpoint 110 first contacts the call center 115, the originating endpoint 110 will be connected to an IVR server 135, such as the CONVERSANT® System for Interactive Voice Response, commercially available from Avaya Inc. The IVR server 135 will obtain the appropriate script, such a VXML script, for the call from the application controller 125. Generally, the application controller 125 provides an indication to the IVR server 135 of the prompts to be played to the originating endpoint 110 and the permitted responses to expect. In addition, the IVR server 135 provides the results of the communication with the originating endpoint 110 to the application controller 125.

In this manner, the application controller 125 determines the particular destination endpoint 120 that will process the call. The application controller 125 accesses a capabilities database 150 that indicates, e.g., the media capabilities of each potential destination endpoint 120, such as all the destination endpoints in an enterprise or a call center of a particular enterprise. The capabilities database 150 may be indexed, for example, by user name, IP address or telephone extension.

In addition, as discussed hereinafter, as part of the initial signaling with the originating endpoint 110, the application controller 125 can determine the media capabilities of the originating endpoint 110. For example, in an exemplary SIP implementation, the originating endpoint 110 first contacts the call center 115 by means of an INVITE message that is routed to the call center 115. The INVITE message is routed to the IVR server 135 and the application controller 125. The parameters included in the INVITE message indicate the media capabilities of the originating endpoint 110, such as whether the originating endpoint 110 can send audio and video.

For each media type supported by the originating endpoint 110, the application controller 125 determines if the media type is supported by the destination endpoint 120, by means of a table lookup in the capabilities database 150. If there are any media types supported by the originating endpoint 110 that are not supported by the destination endpoint 120, the application controller 125 provides a signaling command 175 to a default media server 145 to provide the media. It is noted that the primary communication between the originating endpoint 110 and the destination endpoint 120 can be independent of, or linked with, the media stream from the default media server 145.

In the exemplary embodiment shown in FIG. 1, the default media server 145 obtains the appropriate media from a media library 155. The media content may be one or more of images, video, audio or text. The selection of appropriate media can be based on techniques described, for example, in U.S. patent application Ser. No. 10/983,558, filed Nov. 8, 2004, and entitled "Dynamic Content Delivery," incorporated by reference herein.

Determination by Signaling Observation

Figure 2:
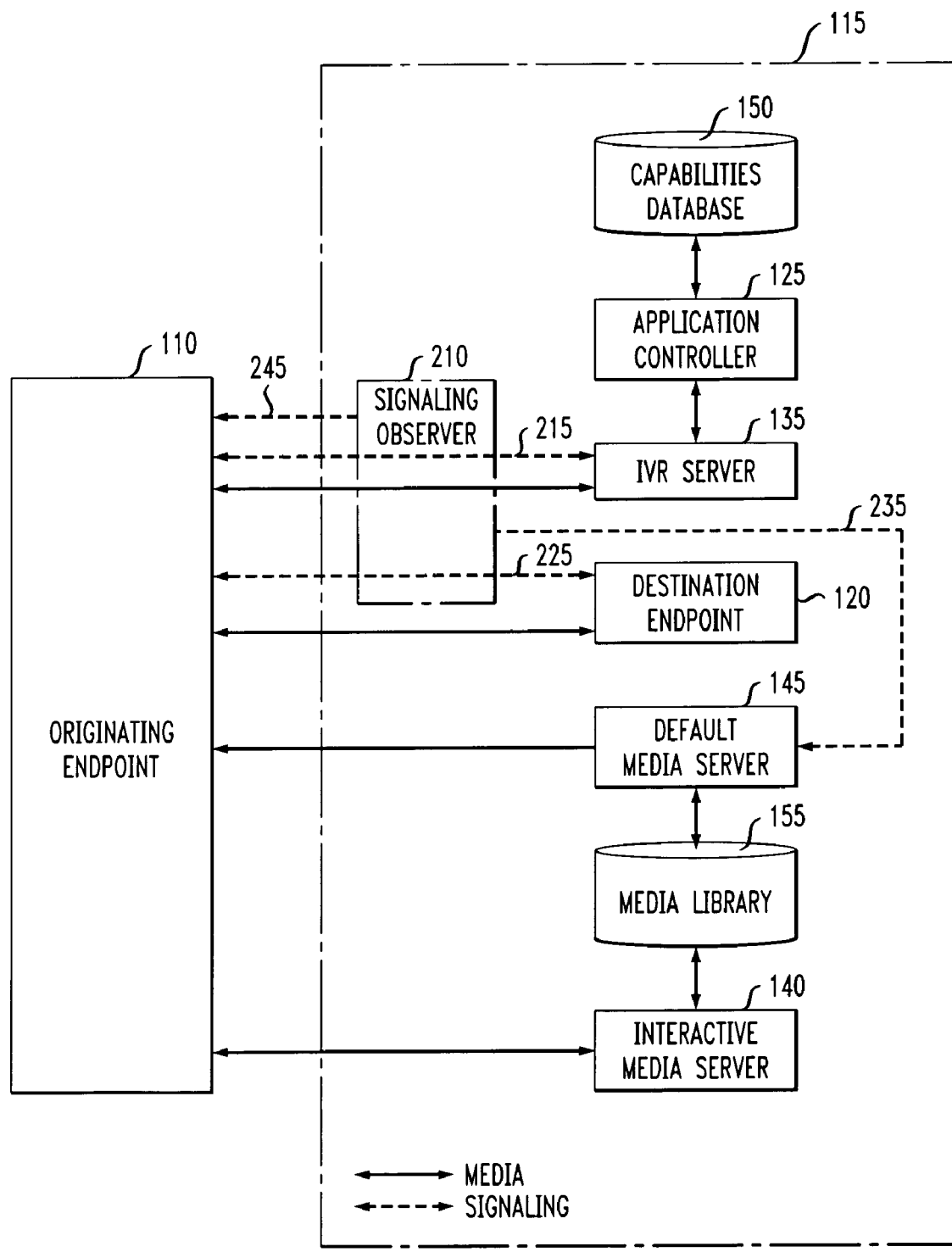
FIG. 2 illustrates an exemplary network environment in which a second embodiment the present invention can operate.

FIG. 2 illustrates an exemplary network environment in which a second embodiment the present invention can operate. Generally, a signaling observer 210 determines that a destination endpoint 120 is not providing a media stream of a given media type as part of the signaling with the destination endpoint 120 before transferring a call to the destination endpoint 120. As shown in FIG. 2, the originating endpoint 110 contacts the call center 115, by means of a network, and is eventually transferred to a destination endpoint 120.

In the embodiment of FIG. 2, the media capabilities of the originating endpoint 110 are determined as part of the initial signaling 215 with the originating endpoint 110. For example, in an exemplary SIP implementation, the originating endpoint 110 first contacts the call center 115 by means of an INVITE message that is routed to the call center 115. The INVITE message is routed, for example, to the IVR server 135. The parameters included in the INVITE message indicate the media capabilities of the originating endpoint 110, such as whether the originating endpoint 110 can send audio and video.

Thereafter, the IVR server 135 sends a message indicating that the IVR server 135 can support, for example, audio and video. Assume that the IVR server 135 accepts audio only, and the originating endpoint 110 accepts audio and video. Thereafter, two way audio is established between the IVR server 135 and the originating endpoint 110 and one way video is established from the IVR server 135 to the originating endpoint 110.

After interacting with the originating endpoint 110, the IVR server 135 is instructed by a signal (such as a script) from the application controller 125 to transfer the call to an agent associated with a destination endpoint 120. Assume that the destination endpoint 120 does not support video. The audio portion of the call is transferred to the destination endpoint 120.

According to one aspect of the invention, the signaling observer 210 observes the signals 215, 225 exchanged between the originating endpoint 110, IVR server 135 and destination endpoint 120 and determines that the destination endpoint 120 does not support a media stream of a given media type that is supported by the originating endpoint 110. Thus, the signaling observer 210 provides a signal 235 instructing the default media server 145 to provide a default media stream of the given media type to the originating endpoint 110. In addition, the signaling observer 210 provides a signal 245 instructing the originating endpoint 110 to accept a default media stream of the given media type from the default media server 145.

Determination by Loss-of-Stream Observation

Figure 3:
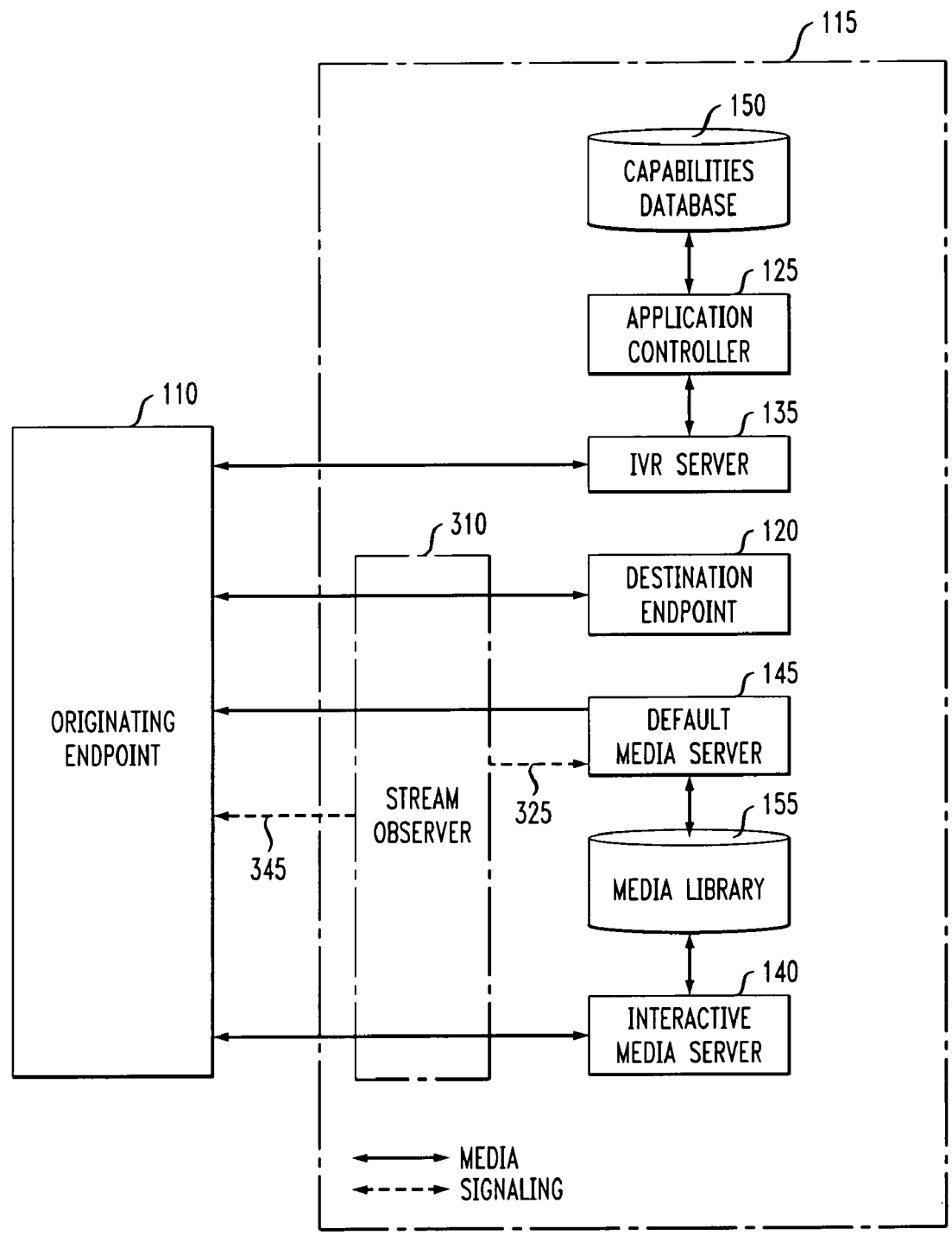
FIG. 3 illustrates an exemplary network environment in which a third embodiment the present invention can operate.

FIG. 3 illustrates an exemplary network environment in which a third embodiment the present invention can operate. Generally, a stream observer 310 monitors the communication between the originating endpoint 110 and the destination endpoint 120 and determines that a media stream of a given media type is not being provided. As shown in FIG. 3, the originating endpoint 110 contacts the call center 115, by means of a network, and is eventually transferred to a destination endpoint 120. The stream observer 310 continues to monitor the communication stream between the originating endpoint 110 and the call center 115, even if the communication is transferred to multiple nodes within the call center 115.

In the embodiment of FIG. 3, the media capabilities of the originating endpoint 110 are again determined as part of the initial signaling with the originating endpoint 110, in the manner described above. For example, in an exemplary SIP implementation, the originating endpoint 110 first contacts the call center 115 by means of an INVITE message that is routed to the call center 115. The INVITE message is routed, for example, to the IVR server 135. The parameters included in the INVITE message indicate the media capabilities of the originating endpoint 110, such as whether the originating endpoint 110 can send audio and video.

Thereafter, the IVR server 135 sends a message indicating that the IVR server 135 can support, for example, audio and video. Assume that the IVR server 135 accepts audio only, and the originating endpoint 110 accepts audio and video. Thereafter, two way audio is established between the IVR server 135 and the originating endpoint 110 and one way video is established from the IVR server 135 to the originating endpoint 110.

After interacting with the originating endpoint 110, the IVR server 135 may be instructed by a signal from the application controller 125 to transfer the call to an agent associated with a destination endpoint 120, as described above. The stream observer 310 continues to monitor the communication stream, such as an RTP communication stream, between the originating endpoint 110 and the call center 115, to ensure that the media stream of a given media type continues to be sent from the destination endpoint 120, or another destination endpoint that becomes associated with the call, to the originating endpoint 110.

If the stream observer 310 determines at any time that the RTP stream stops or is momentarily interrupted, the stream observer 310 provides a signal 325 instructing the default media server 145 to provide a default media stream of the given media type to the originating endpoint 110. In addition, the stream observer 310 can provide a signal 345 instructing the originating endpoint 110 to accept a default media stream of the given media type from the default media server 145. The stream observer 310 continues to monitor the RTP stream, and if the RTP stream resumes for active video, the stream observer 310 instructs the default media server 145 to suspend the default stream and the stream observer 310 permits the active video stream from the destination endpoint 120 to be sent.

Default Media Delivery Process

Figure 4:
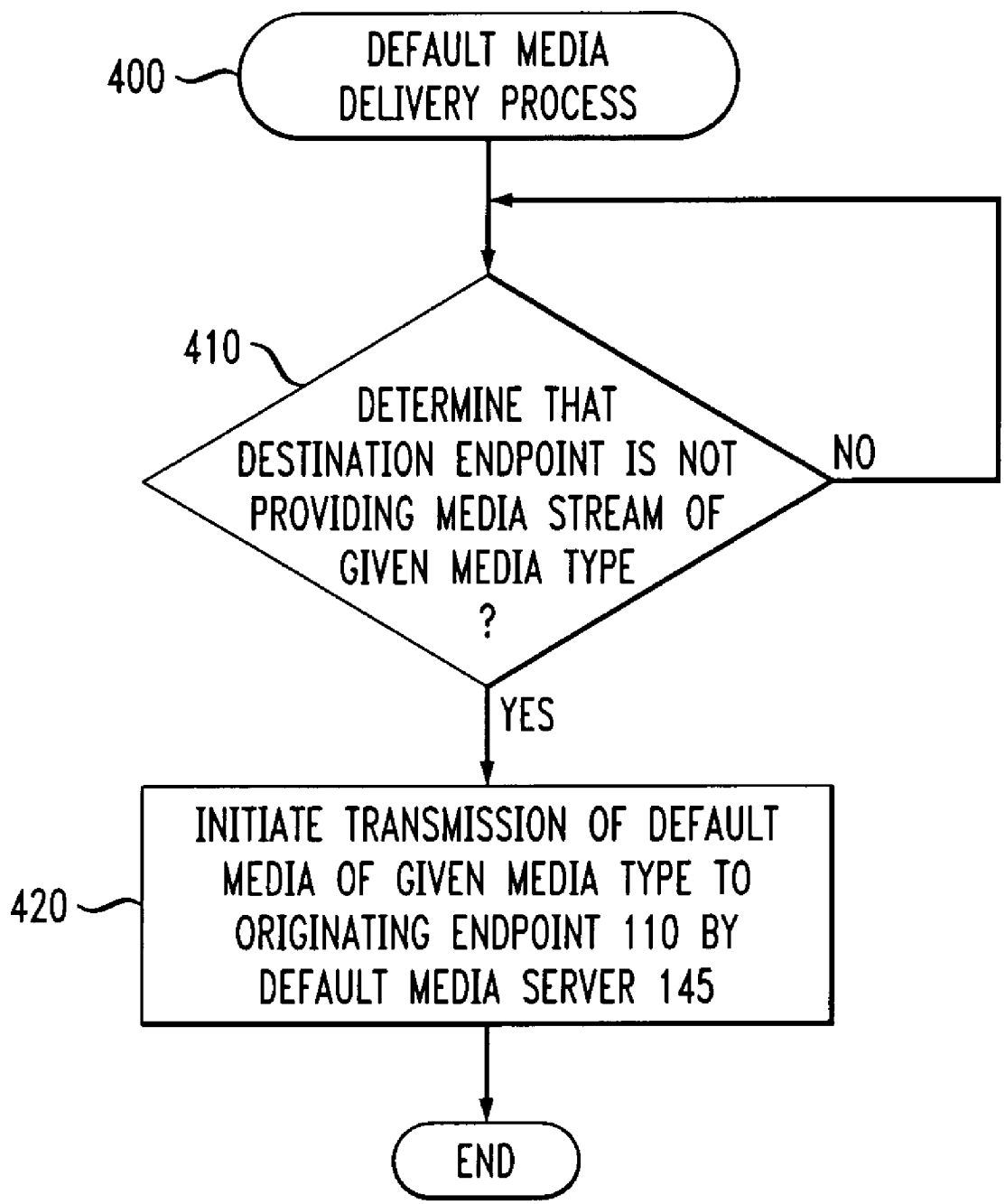
FIG. 4 is a flow chart describing an exemplary implementation of a default media delivery process incorporating features of the present invention.

FIG. 4 is a flow chart describing an exemplary implementation of a default media delivery process 400 incorporating features of the present invention. Generally, the default media delivery process 400 determines when a destination endpoint 120 is not providing a media stream of a given media type and initiates the provision of a default media stream of the given media type to the originating endpoint 110. Generally, the default media delivery process 400 is performed by a different entity for each of the embodiments discussed herein. For each of the following various illustrative server-side implementations, namely, determination by capabilities database; determination by signaling observation; and determination by loss-of-stream observation, the default media delivery process 400 is performed by the application controller 125, signaling observer 210 and stream observer 310, respectively.

As shown in FIG. 4, the exemplary default media delivery process 400 initially performs a test during step 410 until it is determined that a destination endpoint 120 is not providing a media stream of a given media type. Once it is determined during step 410 that a destination endpoint 120 is not providing a media stream of a given media type, then the default media delivery process 400 initiates transmission of default media of the given media type to the originating endpoint 110 during step 420 by the default media server 145. Thereafter, program control terminates.

Client-Side Implementations

As previously indicated, the present invention can also be implemented using a client-side implementation to determine that a destination endpoint is not providing a media stream of a given media type (i) by employing prior knowledge of the media capabilities of the destination endpoint 120 or by accessing a directory indicating the media capabilities of the destination endpoint 120 (such as a directory in accordance with the proposed IETF ENUM standard (RFC 2916) that maps telephone numbers to IP addresses, where a returned PSTN type telephone address, as opposed to, for example, a SIP address, indicates that the destination endpoint 120 does not support video); (ii) as part of the signaling with the destination endpoint 120, the originating endpoint 110 realizes that the destination endpoint 120 will not be sending video; or (iii) by monitoring the communication at the originating endpoint 110 between the originating endpoint 110 and the destination endpoint 120. For the following illustrative client-side implementations, namely, client-side determination by capabilities database; client-side determination by signaling observation; and client-side determination by loss-of-stream observation, the default media delivery process 400 is performed by the originating endpoint 110 itself, a client-side signaling observer and a client-side stream observer, respectively.

In addition, while the default media server 145 and media library 155 are illustrated on the server side, associated with the call center 115, the default media server 145 or media library 155 (or both) can alternatively be associated with the client-side, such as a media library provided by the originating endpoint 110 itself or by an enterprise server associated with the originating endpoint 110, or with a carrier, such as an Internet Service Provider.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method comprising:
   determining that a destination endpoint is not providing a media stream of a first media type to an originating endpoint; and
   initiating transmission of default media of said first media type to said originating endpoint.

2. The method of claim 1, wherein said determining step is performed by an application controller that determines that said destination endpoint does not support said first media type.

3. The method of claim 2, wherein said application controller determines media capabilities of said destination endpoint by accessing a capabilities database.

4. The method of claim 1, wherein said determining step is performed by a signaling observer that monitors signaling between said originating endpoint and said destination endpoint to determine that said destination endpoint is not sending said first media type.

5. The method of claim 4, wherein said signaling observer determines that said destination endpoint is not sending said first media type prior to transferring said communication to said destination endpoint.

6. The method of claim 1, wherein said determining step is performed by a stream observer that monitors said communication between said originating endpoint and said destination endpoint to determine that said destination endpoint is not sending said first media type.

7. The method of claim 1, further comprising the step of determining media capabilities of said originating endpoint.

8. The method of claim 1, wherein said default media is provided by a server associated with said destination endpoint.

9. The method of claim 1, wherein said default media is provided by a server associated with said originating endpoint.

10. The method of claim 1, wherein said default media is provided by a server associated with a carrier of said communication.

11. The method of claim 1, wherein said determining step is performed by a processor associated with said destination endpoint.

12. The method of claim 1, wherein said determining step is performed by a processor associated with said originating endpoint.

13. The method of claim 1, wherein said determining step is performed by a processor associated with a carrier of said communication.

14. An apparatus comprising:
    a memory; and
    at least one processor, coupled to the memory, operative to:
    determine that a destination endpoint is not providing a media stream of a first media type to an originating endpoint; and
    initiate transmission of default media of said first media type to said originating endpoint.

15. The apparatus of claim 14, further comprising an application controller that determines that said destination endpoint does not support said first media type.

16. The apparatus of claim 15, wherein said application controller determines media capabilities of said destination endpoint by accessing a capabilities database.

17. The apparatus of claim 14, further comprising a signaling observer that monitors signaling between said originating endpoint and said destination endpoint to determine that said destination endpoint is not sending said first media type.

18. The apparatus of claim 17, wherein said signaling observer determines that said destination endpoint is not sending said first media type prior to transferring said communication to said destination endpoint.

19. The apparatus of claim 14, further comprising a stream observer that monitors said communication between said originating endpoint and said destination endpoint to determine that said destination endpoint is not sending said first media type.

20. The apparatus of claim 14, wherein said default media is provided by a server associated with said destination endpoint.

21. The apparatus of claim 14, wherein said default media is provided by a server associated with said originating endpoint.

22. The apparatus of claim 14, wherein said default media is provided by a server associated with a carrier of said communication.

23. The apparatus of claim 14, wherein said at least one processor is associated with said destination endpoint.

24. The apparatus of claim 14 wherein said at least one processor is associated with said originating endpoint.

25. The apparatus of claim 14, wherein said at least one processor is associated with a carrier of said communication.

26. A machine readable medium storing computer readable code which when executed by a processor performs the following:

providing content to one or more parties of a communication;

determining that a destination endpoint is not providing a media stream of a first media type to an originating endpoint; and initiating transmission of default media of said first media type to said originating endpoint.

* * * * *